United States Patent [19]

Yoshinaga et al.

[11] Patent Number: 4,488,992
[45] Date of Patent: Dec. 18, 1984

[54] MONOAZO DYESTUFFS DERIVED FROM BENZOTHIAZOLE

[75] Inventors: Kenji Yoshinaga, Toyonaka; Kiyoyasu Hashimoto, Ibaraki; Tetsuo Okaniwa, Amagasaki; Hirohito Kenmochi, Takatsuki, all of Japan

[73] Assignee: Sumitomo Chemical Company, Limited, Osaka, Japan

[21] Appl. No.: 100,911

[22] Filed: Dec. 6, 1979

[30] Foreign Application Priority Data

Dec. 25, 1978 [JP] Japan ................................. 53-163617
Oct. 3, 1979 [JP] Japan ................................. 54-128308

[51] Int. Cl.³ .................... C07D 277/82; C09B 29/08
[52] U.S. Cl. .................................................. 534/788
[58] Field of Search ......................................... 260/158

[56] References Cited

U.S. PATENT DOCUMENTS 2,889,315  6/1959  Bossard et al. ............... 260/158 X
3,639,384  2/1972  Weaver et al. ..................... 260/158
4,052,379 10/1977  Gourley ......................... 260/158 X
4,247,458  1/1981  Shuttleworth ....................... 260/158

FOREIGN PATENT DOCUMENTS 45-7712   3/1970  Japan ................................. 260/158
50-18780  2/1975  Japan ................................. 260/158
50-21029  3/1975  Japan ................................. 260/158
1448782   9/1976  United Kingdom ................ 260/158

OTHER PUBLICATIONS

Japanese Industrial Standard L 0879–1975 and English translation thereof.
Japanese Industrial Standard L 0849–1971.
International Organization for Standardization 105 x 12–1978, (corresponding to Japanese Industrial Standard L 0849–1971).
International Organization for Standardization 105–A0-1–1978.
International Organization for Standardization 105–A0-3–1978, (corresponding to Japanese Industrial Standard 0801).

Primary Examiner—Charles F. Warren
Attorney, Agent, or Firm—Stevens, Davis, Miller & Mosher

[57] ABSTRACT

A disperse dye of the formula,

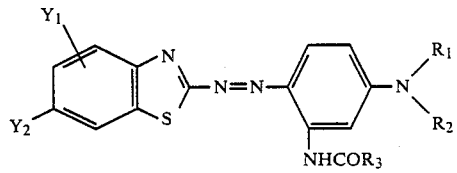

wherein $R_1$ is an alkyl group having 5 to 6 carbon atoms, $R_2$ is an alkyl group having 5 to 6 carbon atoms, a cyano-ethyl group, $R_3$ is a hydrogen atom or a lower alkyl, amino or phenyl group, and $Y_1$ and $Y_2$ represent independently a hydrogen atom, a lower alkyl group, a lower alkoxy group, a halogen atom, a nitro group, a cyano group, a thiocyanate group or an alkylsulfonyl group, provided that both $Y_1$ and $Y_2$ are not hydrogen at the same time and $Y_1$ is located at the 4- or 5-position, which is useful for dyeing hydrophobic fibers in brilliant red to violet shade with good fastnesses.

3 Claims, No Drawings

MONOAZO DYESTUFFS DERIVED FROM BENZOTHIAZOLE

The present invention relates to novel benzothiazole monoazo dyes suitably useful for dyeing or printing hydrophobic fibers.

With the recent tendency to more fashion-mined use, uplift of quality and higher valuation of the hydrophobic fibers, particularly polyester fibers, the colored discharge printing system has come to assume greater prominence among other dyeing techniques. This system is characterized by its availability for delicate and bold expressions of printing patterns and its uniqueness in application of such patterns with vivid and fresh colors on various types of textile fabrics.

The dyes usable in this system can be divided into two types: dischargeable dyes for ground-dyeing and non-dischargeable dyes for effect color of printing. Among them, the latter type of dyes are posing no serious problem in their use because of good color fastness of the existing dyes of this type. As for the dischargeable ground-dyeing dyes, they should meet requirements such that they are perfectly decomposed to become colorless by a discharging treatment or even if the decomposed matter after the discharging treatment should retain color, such color should be easily eliminated, and they should superior in various required fastnesses. It has been attempted to select one which can meet such requirements from the existing dyes or to develop a new dye, but so far, no satisfactory result has been reached in these attempts.

For example, a dye of the following formula:

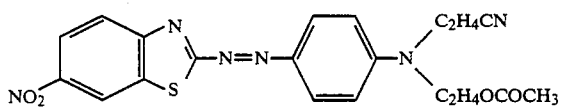

proposed in Japanese Patent Publication No. 16039/61 is used as red dye, but this dye is still unsatisfactory in the aspects of hue and color fastness. Thus, request has been voiced for the development of a dischargeable red or violet dyestuff which has excellent dyeability as well as various good fastness properties, particularly wet color fastness after resin finishing.

As a result of more extensive studies for the development of a dischargeable red or violet dyestuff usable for ground dyeing, the present inventors found a novel dye having very excellent dischargeability, dyeing affinity, hue, build-up property, color fastnesses to light, sublimation, potting, and the like as well as wet fastness to washing after resin finishing, domestic laundering, water, etc.

The present invention provides a benzothiazole monoazo dye of the formula [I],

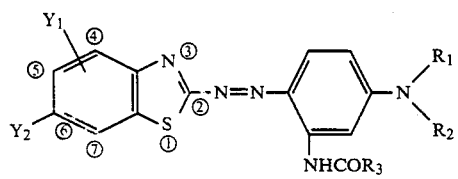

wherein $R_1$ is an alkyl group having 4 to 9 carbon atoms, $R_2$ is an alkyl group having 1 to 6 carbon atoms, a cyano- or halogen-substituted alkyl group having 1 to 6 carbon atoms, $R_3$ is a hydrogen atom or a lower alkyl, amino or phenyl group, and $Y_1$ and $Y_2$ represent independently a hydrogen atom, a lower alkyl group, a lower alkoxy group, a halogen atom, a nitro group, a cyano group, a thiocynate group or an alkylsulfonyl group, provided that both $Y_1$ and $Y_2$ are not hydrogen atom at the same time and $Y_1$ is located at the 4- or 5-position; a process for preparing the same comprising diazotizing a 2-aminobenzothiazole compound represented by the formula (II):

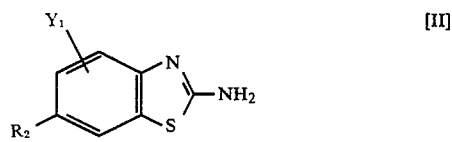

wherein $Y_1$ and $Y_2$ are as defined above, and coupling resulting diazotized compound with a compound represented by the formula (III):

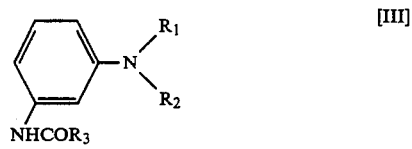

wherein $R_1$, $R_2$ and $R_3$ are as defined above; and a process for dyeing or printing hydrophobic fibers comprising using the dye of the formula [I].

In the present invention, the term "lower alkyl" means an alkyl having 1 to 4 carbon atoms (e.g. methyl, ethyl, propyl, butyl), and "lower alkoxy" means an alkoxy having 1 to 4 carbon atoms. Preferred examples for $R_1$ include n-butyl, n- or iso-pentyl and n-hexyl, and of these the most preferred is n-pentyl. Preferred examples for $R_2$ include alkyls (e.g. n-butyl, n- or isopentyl, hexyl), haloalkyls (e.g. chloroethyl), and cyanoalkyls (e.g. cyanoethyl), and of these the most preferred is cyanoethyl. Preferred examples for $R_3$ are hydrogen, lower alkyls (e.g. methyl, ethyl) and phenyl, and of these the most preferred is methyl. Preferred examples for $Y_1$ include hydrogen, and halogens (e.g. chlorine or bromine) and for $Y_2$ include lower alkoxys (e.g. methoxy), halogens (e.g. chlorine, bromine), nitro, cyano and alkylsulfonyls (e.g. methylsulfonyl, ethylsulfonyl), and the most preferred for $Y_1$ and $Y_2$ is hydrogen and chlorine, respectively.

In the production of the dye of the formula [I], diazotization of the 2-aminobenzothiazole compounds represented by the formula (II) in this invention can be accomplished at a relatively low temperature, preferably at about $-10°$ to $10°$ C. within 2 to 8 hours by using sodium nitrite or nitrosylsulfuric acid in an amount of 1.0 to 1.1 mole per mole of the compound (II) in a mineral acid (such as hydrochloric acid, sulfuric acid, phosphoric acid, etc.) or an organic acid (such as acetic acid, propionic acid, etc.).

Listed below are some typical examples of said 2-aminobenzothiazole compounds:
2-amino-6-nitrobenzothiazole
2-amino-6-methylsulfonylbenzothiazole
2-amino-6-methoxybenzothiazole
2-amino-6-ethoxybenzothiazole
2-amino-6-chlorobenzothiazole
2-amino-6-bromobenzothiazole 2-amino-6-iodobenzothiazole
2-amino-6-cyanobenzothiazole
2-amino-6-thiocyanobenzothiazole
2-amino-6-methylbenzothiazole
2-amino-4,6-dichlorobenzothiazole
2-amino-4,6-dibromobenzothiazole
2-amino-5,6-dichlorobenzothiazole
2-amino-5,6-dibromobenzothiazole
2-amino-4-chloro-6-nitrobenzothiazole
2-amino-4-bromo-6-nitrobenzothiazole
2-amino-4-methyl-6-nitrobenzothiazole
2-amino-4-methoxy-6-nitrobenzothiazole
2-amino-4-cyano-6-nitrobenzothiazole
2-amino-4-nitro-6-chlorobenzothiazole
2-amino-4-cyano-6-chlorobenzothiazole Coupling of the diazotized 2-aminobenzothiazole compound of the formula (II) and the compound of the formula (III) is performed in an aqueous medium. In order to elevate solubility of the compound of the formula (III), there may be used an alcoholic organic solvent such as methanol, ethanol, propanol, butanol, etc. or an organic acid such as acetic acid, propionic acid, etc., or a mineral acid such as hydrochloric acid, sulfuric acid, phosphoric acid, etc. The coupling can be accomplished at a relatively low temperature, preferably at $-10°$ to $10°$ C., within 2 to 10 hours using the compound (III) in an amount of 1.0 to 1.1 mole per mole of the diazotized compound (II).

As examples of the compounds represented by the formula (III), there may be cited the following:
3-di(n-pentyl)aminoacetoanilide
3-di(n-hexyl)aminoacetoanilide
3-(N-n-pentyl-N-ethyl)aminoacetoanilide
3-(N-n-pentyl-N-β-cyanoethyl)aminoacetoanilide
3-(N-n-pentyl-N-β-chloroethyl)aminoacetoanilide
3-carbamoylamino-di(n-pentyl)aniline
3-propionylamino-di(n-pentyl)aniline
3-propionylamino-di(n-hexyl)aniline
3-formylamino-di(n-pentyl)aniline
3-di(iso-pentyl)aminoacetoanilide
3-(N-n-butyl-N-n-pentyl)aminoacetoanilide
3-(N-n-propyl-N-n-hexyl)aminoacetoanilide
3-(N-n-butyl-N-ethyl)aminoacetoanilide
3-(N-n-butyl-N-β-cyanoethyl)aminoacetoanilide The dye produced in the manner described above is pulverized into fine particles usually in an aqueous medium together with a suitable dispersant and used in the form of a paste or in the form of powder prepared by spray drying.

Among the examples of the dyes represented by the formula (I) are such as those listed in Table 1 below.

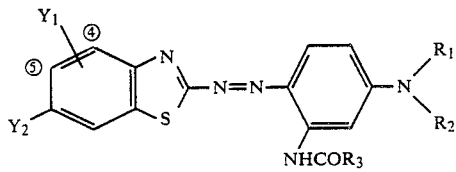

TABLE 1

| No. | $Y_1$ | $Y_2$ | $R_1$ | $R_2$ | $R_3$ | DMF λ max (nm) |
|---|---|---|---|---|---|---|
| 1 | 4-Cl | Cl | n-$C_5H_{11}$ | n-$C_5H_{11}$ | $CH_3$ | 557 |
| 2 | 4-Br | Br | " | " | " | 557 |

TABLE 1-continued

| No. | $Y_1$ | $Y_2$ | $R_1$ | $R_2$ | $R_3$ | DMF λ max (nm) |
|---|---|---|---|---|---|---|
| 3 | H | Cl | " | " | " | 545 |
| 4 | " | Br | " | " | " | 546 |
| 5 | " | $NO_2$ | " | " | " | 575 |
| 6 | " | $SO_2C_2H_5$ | " | " | " | 557 |
| 7 | " | CN | " | " | " | 560 |
| 8 | " | SCN | " | " | " | 560 |
| 9 | " | $OCH_3$ | " | " | " | 542 |
| 10 | " | $SO_2CH_3$ | " | " | " | 557 |
| 11 | " | Cl | " | $C_2H_4CN$ | " | 530 |
| 12 | " | Br | " | " | " | 530 |
| 13 | 4-Cl | Cl | " | " | " | 532 |
| 14 | 4-Br | Br | " | " | " | 532 |
| 15 | " | " | n-$C_6H_{13}$ | n-$C_6H_{13}$ | " | 557 |
| 16 | H | $SO_2CH_3$ | " | $C_2H_4Cl$ | " | 535 |
| 17 | 5-Cl | Cl | " | $C_2H_5$ | $C_2H_3$ | 560 |
| 18 | " | " | iso-$C_5H_{11}$ | iso-$C_5H_{11}$ | " | 545 |
| 19 | 5-Br | Br | n-$C_4H_9$ | $C_2H_5$ | H | 545 |
| 20 | 5-Br | Br | n-$C_4H_9$ | $C_2H_4CN$ | phenyl | 545 |
| 21 | H | $NO_2$ | n-$C_5H_{11}$ | n-$C_5H_{11}$ | $CH_3$ | 575 |

The dyes of the formula (I) obtained according to the above-described process can be advantageously used for dyeing or printing hydrophobic fibers, particularly polyester fibers to give a brilliant red to violet color with excellent color fastnesses to light, sublimation, etc., as well as excellent color fastness to domestic laundering, water, etc., after resin finishing. What is especially noteworthy is their splendid availability as ground-dyeing dyes for the colored discharge printing system. An additional advantage of the dyes of the formula (I) is their extremely high molar absorbance.

In carrying out the dyeing of hydrophobic fibers using the dyes of the present invention, the dye is first pulverized into fine particles in an aqueous medium together with a suitable dispersant to prepare a paste-like dye agent or a powdery dye agent by spray drying of the paste or other means. The fibers are dipped in an aqueous medium containing the dye agent, and the dyeing is carried out at a temperature of 105° C. or higher, preferably 100°–140° C. under increased pressure, or the dyeing may be carried out in the presence of a carrier such as o-phenylphenol or trichlorobenzene at a relatively high temperature, for example under a boiling water condition.

Further, the so-called thermosol method may also be applied, that is, hydrophobic fiber cloth may be dyed by padding the cloth with a dye disperse liquor followed by dry-heat treatment at 150° to 230° C. for 30 to 60 seconds.

Still further, the dye (I) of the present invention may effectively be applied to printing methods which comprise printing the cloth with a color paste produced from a dye (I)-containing dispersion and a suitable thickening agent, followed by steaming or thermosol treatment. Also, the dye (I) may be applied to solvent dyeing methods using an organic solvent (e.g. trichloroethylene, perchloroethylene) as a dyeing medium.

Shown below are the results of comparative tests conducted using the dyes of the present invention and the known dyes of similar type. It will be understood from Table 2 that the dyes of this invention are superior to the known dyes in hue, dischargeability and color fastness after resin finishing.

TABLE 2

| | Formula | Hue (Brilliancy) | Dischargeability (white dischargeability) | Color fastness after resin finishing | | | | | |
|---|---|---|---|---|---|---|---|---|---|
| | | | | Washing | | | Water | | |
| | | | | Discoloration | Nylon staining | Silk staining | Discoloration | Nylon staining | Silk staining |
| Known dye | 6-$O_2N$-benzothiazol-2-yl-$N=N$-$C_6H_4$-$N(C_2H_4CN)(C_2H_4OCOCH_3)$ <br> Dye of Japanese Pat. Pub. No. 16039/61 | Δ | Δ | 5 | 4 | 3 | 5 | 2–3 | 2–3 |
| | 6-$SO_2CH_3$-benzothiazol-2-yl-$N=N$-(3-$CH_3$)$C_6H_3$-$N(C_2H_5)(C_2H_4CN)$ <br> Dye of Japanese Pat. Pub. No. 5949/66 | Δ | Δ | 5 | 4–5 | 3–4 | 5 | 3 | 2–3 |
| | 4-$OCH_3$,6-$O_2N$-benzothiazol-2-yl-$N=N$-(3-$NHCOCH_3$)$C_6H_3$-$N(C_2H_4OCOCH_3)_2$ <br> Dye of Japanese Pat. Pub. No. 7712/70 | ◎ | ◎ | | | | | | |
| Dye of this invention | 6-Cl-benzothiazol-2-yl-$N=N$-(3-$NHCOCH_3$)$C_6H_3$-$N(C_5H_{11}-n)_2$ <br> (No. 1) | ◎ | ◎ | 5 | 4–5 | 4–5 | 5 | 5 | 5 |
| | 6-$SO_2CH_3$-benzothiazol-2-yl-$N=N$-(3-$NHCOCH_3$)$C_6H_3$-$N(C_5H_{11}-n)_2$ <br> (No. 10) | ○ | ◎ | 5 | 5 | 5 | 5 | 4–5 | 4–5 |
| | 4,7-diBr-benzothiazol-2-yl-$N=N$-(3-$NHCOCH_3$)$C_6H_3$-$N(C_5H_{11}-n)(C_2H_4CN)$ <br> (No. 14) | | | 5 | 4–5 | 4–5 | 5 | 4–5 | 4–5 |

Notes:
(1) Dyeing method: High-temperature dyeing
Material to be dyed: Polyester fabric
Dye concentration: 3.0% owf
Dyeing condition: pH 5.0 (acetic acid-sodium acetate buffer), 130° C., 60 min.
Hue was judged according to visual test: (◎: excellent; ○: good; Δ: rather poor; x: poor)
(2) Resin treatment (finishing)
Sumistat F-1 (antistatic agent mfd. by Sumitomo Chemical Co.) 10 g/l
Sumitex Softener LK-1 (softener, manufactured by Sumitomo Chemical Co.) 10 g/l
Procedure of immersion and squeezing was repeated twice.
Heat setting:
Intermediate drying conditions: 80° C., 2 min.
Heat-setting conditions: 160° C., 2 min.
(3) Fastness
Color fastness to washing: AATCC No. II-A
Color fastness to water: JIS L0846-1967 A
(4) White discharging
White discharging paste composition (stannous chloride method)
- Stannous chloride — 10 parts by weight
- Urea — 3 parts by weight
- Tetorocin p-300 — 3 parts by weight
- Glyecin A — 3 parts by weight
- 10% Maypro grm NP 60 — 60 parts by weight
- Hot water — 21 parts by weight
- Total — 100 parts by weight TABLE 2-continued White discharging process:
Printing → drying → steaming (130° C., 30 min.) → washing with water → reduction clearing → washing with water → drying
Judgment: The degree of tinting at the white-discharged parts was determined accordings to the gray scale for staining. (⊚: excellent; ○: good; Δ: rather poor; X: poor)

The invention is now described in further detail with reference to the following Examples, which are only illustrative and are not intended to limit the scope of the present invention. All the "parts" appearing in the following Examples are by weight.

EXAMPLE 1

11.0 Parts of 2-amino-4,6-dichlorobenzothiazole was added to 150 parts of 85% phosphoric acid at room temperature and the mixture was heated at 90°–95° C. to form a complete solution. To the solution cooled to less than 0° C., was added 0.5 part of a silicon type defoamer and then was added 4.14 parts of sodium nitrite dividing into five parts at less than 0° C. over the period of 30 minutes. The mixture was thereafter kept at below 0° C. for 2 hours to complete the diazotization.

In the meantime, 14.5 parts of 3-di(n-pentyl)-aminoacetoanilide was dissolved in 100 parts of methanol, followed by addition of 100 parts of ice to cool the solution below 0° C. Then the above-said diazo solution was poured into this solution over a period of 30 minutes while maintaining the temperature below 0° C. to effect coupling. The mixture was further kept at the temperature below 0° C. for 2 hours to complete coupling. The precipitated dye was separated by filtration, washed with 200 parts of water and dried. There was obtained 22.1 parts of dark red crystals.

The thus obtained crystals had the formula of No. 1 in Table 1, melting point of 167°–168° C. and molar absorption coefficient of as high as $6.7 \times 10^4$ $l \cdot cm^{-1} \cdot mol^{-1}$.

EXAMPLE 2

9.2 Parts of 2-amino-6-chlorobenzothiazole was added and dispersed in 100 parts of 40% sulfuric acid, and the mixture was cooled below 0° C. by external cooling and further added dropwise with 14.8 parts of 43% nitrosylsulfuric acid at less than 0° C. over a period of 1 hour. The mixture was kept below 0° C. for 2 hours to complete the diazotization. In the meantime, 13.7 parts of 3-(N-n-pentyl-N-β-cyanoethyl)aminoacetoanilide was added and dissolved in 50 parts of acetic acid, followed by addition of 100 parts of ice to cool the solution below 0° C., and the above-said diazo solution was poured thereinto over a period of 1 hour while cooling below 0° C. to effect coupling. The mixture was kept below 0° C. for 2 hours to complete coupling.

The precipitated dye was separated by filtration, washed with 200 parts of water and dried, whereby there was obtained 21.1 parts of dark red crystals.

The thus obtained crystals had the structure of No. 11 in Table 1, melting point of 162°–163° C. and molar absorption coefficient of as high as $5.9 \times 10^4$ $l \cdot cm^{-1} \cdot mol^{-1}$.

EXAMPLE 3

The process of Example 1 was repeated but by using 9.5 parts of 2-amino-6-nitrobenzothiazole instead of 11.0 parts of 2-amino-4,6-dichlorobenzothiazole, obtaining dark violet crystals. These crystals had the structure of No. 5 in Table 1, melting point of 171°–174.5° C. and molar absorption coefficient of as high as $7.4 \times 10^4$ $l \cdot cm^{-1} \cdot mol^{-1}$.

EXAMPLE 4

The process of Example 1 was followed but by using 9.2 parts of 2-amino-6-chlorobenzothiazole instead of 11.0 parts of 2-amino-4,6-dichlorobenzothiazole, obtaining dark red crystals which had the structure of No. 3 in Table 1, melting point of 159°–160.5° C. and molar absorption coefficient of as high as $6.9 \times 10^4$ $l \cdot cm^{-1} \cdot mol^{-1}$.

EXAMPLE 5

The process of Example 1 was carried out but by using 15.3 parts of 2-amino-4,6-dibromobenzothiazole instead of 11.0 parts of 2-amino-4,6-dichlorobenzothiazole, obtaining dark red crystals having the structure of No. 2 in Table 1, melting point of 164°–165° C. and molar absorption coefficient of as high as $6.9 \times 10^4$ $l \cdot cm^{-1} \cdot mol^{-1}$.

EXAMPLE 6

The process of Example 2 was repeated but by using 11.0 parts of 2-amino-4,6-dichlorobenzothiazole instead of 9.2 parts of 2-amino-6-chlorobenzothiazole, obtaining dark red crystals having the structure of No. 13 in Table 1, melting point of 165°–167° C. and molar absorption coefficient of as high as $6.0 \times 10^4$ $l \cdot cm^{-1} \cdot mol^{-1}$.

EXAMPLE 7

2.0 Parts of a condensate of naphthalene sulfonic acid and formaldehyde was added to 1.0 part of the powdered dyestuff of No. 1 in Table 1, and the mixture was finely pulverized and dispersed in an aqueous medium, and this dispersion was dried to obtain a dyeing agent. Then 10 parts of polyethylene terephthalate fibers was immersed in a dye bath containing 0.3 parts of said dyeing agent and subjected to 60-minute dyeing under increased pressure at 130°–135° C. Thereafter, the fibers were subjected to soaping at 90° C. and dried to obtain the polyester fiberes which have been dyed to clear wine red with high dye bath stability and had excellent color fastnesses to daylight and sublimation, as well as high wet fastnesses to water and washing after resin finishing.

The dyestuff used in this Example is obtained in the same manner as in Example 1.

EXAMPLE 8

The process of Example 7 was repeated but by using the dyestuffs of Nos. 2 to 4 instead of the dyestuff of No. 1 in Table 1, obtaining the polyester fibers dyed to clear wine red with high dye bath stability and having excellent color fastnesses to daylight and sublimation, as well as high wet fastnesses to water and washing after resin finishing.

EXAMPLE 9

2.0 Parts of sodium lignosulfonate was added to 1.0 part of the powdery dyestuff of No. 11 in Table 1, and the mixture was finely pulverized and dispersed in an aqueous medium, and this dispersion was dried to obtain a dyeing agent. Then 0.3 part of this dyeing agent was added into a dye bath containing 1.0 part of o-phenylphenol as carrier, and 10 parts of polyethylene terephthalate fibers were immersed in this dye bath and subjected to 90-minute dyeing at 98°–100° C. Upon soaping of these fibers at 90° C., there were obtained polyester fibers which have been dyed to clear deep red with high dye bath stability and had excellent color fastnesses to daylight and sublimation, as well as high wet fastnesses to water and washing after resin finishing.

When the above-described process was carried out by using No. 10 dyestuff instead of No. 11 dyestuff, there was obtained a wine red dyed product having excellent color fastnesses properties.

EXAMPLE 10

2.0 Parts of a condensate of naphthalenesulfonic acid and formaldehyde was added to 1.0 part of the powdery dyestuff of No. 13 in Table 1, and the mixture was finely pulverized and dispersed in an aqueous medium. The obtained dispersion was kneaded with a suitable paste and water, then padded on a polyester fabric and, after drying, subjected to 7-minute steaming at 175° C. This fabric was then subjected to soaping at 90° C. to obtain with high dye bath stability a clear red dyed product having excellent color fastnesses to daylight and sublimation, as well as high wet fastnesses to water and washing after resin finishing.

When the above process was repeated by using No. 14 dyestuff instead of No. 13 dyestuff, there was obtained a polyester fabric dyed in brilliant red.

What is claimed is:

1. A disperse dye of the formula (I):

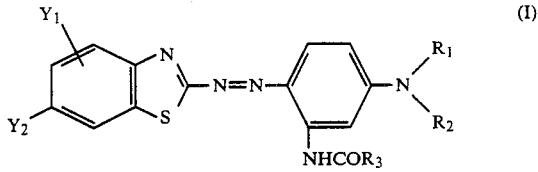

wherein $R_1$ is an alkyl group having 5 to 6 carbon atoms, $R_2$ is a cyanoethyl group, $R_3$ is a lower alkyl group, $Y_1$ is a hydrogen atom at the 4- or 5-position, and $Y_2$ is a halogen atom.

2. A disperse dye according to claim 1, wherein $R_1$ and $R_2$ in the formula (I) are a pentyl group and a cyanoethyl group, respectively, and $R_3$ is a methyl group.

3. A disperse dye of the formula:

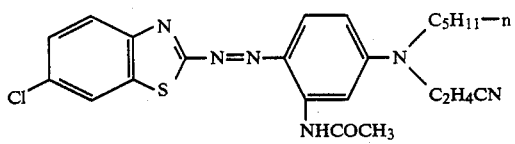

* * * * *